(12) United States Patent
Besutti et al.

(10) Patent No.: US 11,175,629 B2
(45) Date of Patent: Nov. 16, 2021

(54) METHOD FOR MANUFACTURING A HOLE JEWEL

(71) Applicant: Comadur S.A., Le Locle (CH)

(72) Inventors: Bruno Besutti, Charquemont (FR); Thierry Cordier, Montlebon (FR); Pascal Chopard-Lallier, Montlebon (FR)

(73) Assignee: Comadur S.A., Le Locle (CH)

( * ) Notice: Subject to any disclaimer, the term of this patent is extended or adjusted under 35 U.S.C. 154(b) by 349 days.

(21) Appl. No.: 16/170,253

(22) Filed: Oct. 25, 2018

(65) Prior Publication Data

US 2019/0146416 A1   May 16, 2019

(30) Foreign Application Priority Data

Nov. 13, 2017   (EP) ..................................... 17201311

(51) Int. Cl.
*G04B 31/008* (2006.01)
*G04B 31/06* (2006.01)
(Continued)

(52) U.S. Cl.
CPC ............ *G04B 31/0087* (2013.01); *B28B 3/00* (2013.01); *F16C 33/00* (2013.01); *G04B 29/022* (2013.01);
(Continued)

(58) Field of Classification Search
CPC .................................................. G04B 31/0087
See application file for complete search history.

(56) References Cited

U.S. PATENT DOCUMENTS

| 1,642,102 A | 9/1927 | Colomb |
| 2,201,777 A * | 5/1940 | Kliesrath ................. B28B 7/18 |
| | | 264/630 |

(Continued)

FOREIGN PATENT DOCUMENTS

| CH | 371387 | 4/1963 |
| CH | 495 801 | 4/1970 |

(Continued)

OTHER PUBLICATIONS

Combined Chinese Office Action and Search Report dated May 27, 2020 in Patent Application No. 201811347603.3 (with English translation of Category of Cited Documents), 8 pages.

(Continued)

*Primary Examiner* — Erin Snelting
(74) *Attorney, Agent, or Firm* — Oblon, McClelland, Maier & Neustadt, L.L.P.

(57) ABSTRACT

A method for manufacturing a hole jewel, including forming a precursor from a mixture of at least one powder material with a binder; pressing the precursor, with upper lower dies, to form a green body of the future hole jewel including a blind cavity having a height between a height of the green body and a height of the future hole jewel, the cavity being provided with upper and lower portions respectively including blanks of a through hole and of a functional element of the future hole jewel; sintering the green body to form a body of the future hole jewel; machining the body, including a first sub-step of shaping a top of the body, during which a height of the upper portion is configured in readiness for an opening in the through hole blank for connecting the functional element to the upper surface, and a second sub-step of (Continued)

shaping a base of the body to form a lower surface of the hole jewel for connecting the functional element to to the lower surface.

12 Claims, 2 Drawing Sheets

(51) Int. Cl.
| | | |
|---|---|---|
| *B28B 3/00* | (2006.01) | |
| *G04D 3/00* | (2006.01) | |
| *G04B 31/004* | (2006.01) | |
| *F16C 33/00* | (2006.01) | |
| *G04B 29/02* | (2006.01) | |

(52) U.S. Cl.
CPC ........... *G04B 31/004* (2013.01); *G04B 31/06* (2013.01); *G04D 3/0058* (2013.01); *C04B 2235/32* (2013.01); *C04B 2235/3217* (2013.01); *C04B 2235/3241* (2013.01); *C04B 2235/3817* (2013.01); *C04B 2235/3852* (2013.01); *C04B 2235/604* (2013.01); *C04B 2235/612* (2013.01); *G04B 29/027* (2013.01)

(56) References Cited

U.S. PATENT DOCUMENTS

| | | | |
|---|---|---|---|
| 3,883,314 A * | 5/1975 | Schnyder | F16C 33/103 75/231 |
| 4,204,874 A * | 5/1980 | Yamada | C04B 35/115 501/153 |
| 2014/0254332 A1 | 9/2014 | Besutti et al. | |
| 2017/0151691 A1* | 6/2017 | Zimmermann | C04B 35/6455 |

FOREIGN PATENT DOCUMENTS

| | | |
|---|---|---|
| CH | 561 924 | 5/1975 |
| CN | 101196725 A | 6/2008 |
| CN | 104049523 A | 9/2014 |
| CN | 104126152 A | 10/2014 |
| CN | 204422978 U | 6/2015 |
| EP | 2 778 801 A1 | 9/2014 |

OTHER PUBLICATIONS

European Search Report dated May 11, 2018 in European application 17201311.2, filed on Nov. 13, 2017 (with English Translation of Categories Cited).

Chinese Office Action dated Jan. 22, 2021 in Chinese Patent Application No. 201811347603.3, 3 pages.

* cited by examiner

Fig. 1
Fig. 2
Fig. 3
Fig. 4
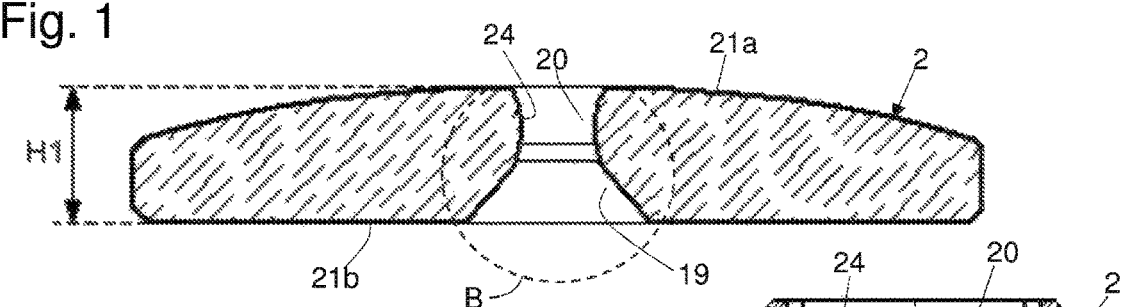
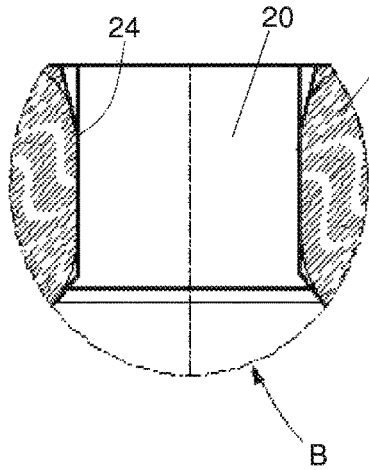
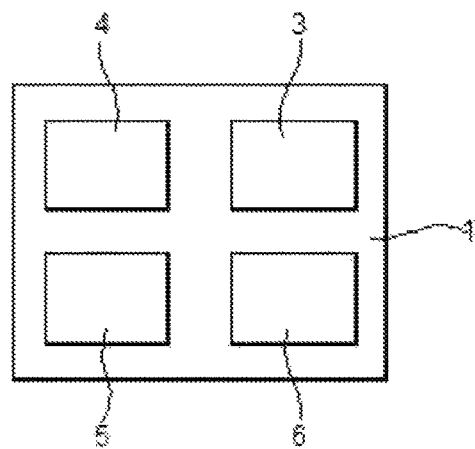
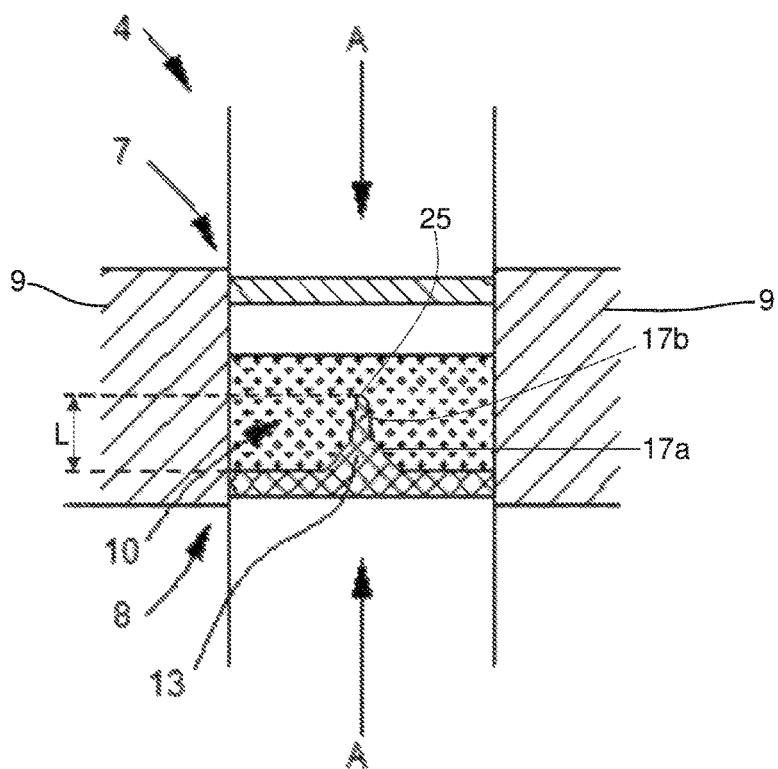

METHOD FOR MANUFACTURING A HOLE JEWEL

CROSS-REFERENCE TO RELATED APPLICATION

This application claims priority to European Patent Application No. 17201311.2 filed on Nov. 13, 2017, the entire disclosure of which is hereby incorporated herein by reference.

FIELD OF THE INVENTION

The invention relates to a method for manufacturing a hole jewel, particularly forming a bearing for a timepiece.

The invention also relates to such a hole jewel and to a mainplate of a timepiece movement and a bridge of a timepiece movement including said hole jewel.

The invention also relates to a timepiece comprising such a timepiece movement mainplate and/or such a timepiece movement bridge.

BACKGROUND OF THE INVENTION

In the state of the art, hole jewels are used, in particular, to form timepiece bearings, said bearings being intended to come into contact with pivots to make the pivots movable in rotation, and with minimum friction. These bearings, which form all or part of a bearing arrangement for a rotatably mounted element, traditionally have a through hole communicating with a recess made in one of the faces thereof which forms a first functional element.

Such a through hole is generally made during the jewel manufacturing process, especially in a step of pressing a precursor in order to obtain a green body of the future hole jewel by means of a press tool with a wire that is used to form the hole. However, this pressing step is often not suitable for making holes with small diameters, for example, which are smaller than 100 μm. Indeed, when such holes are made, it is common for the press tool wire to break under the pressure exerted on the precursor during this pressing step.

To overcome this drawback, one solution consists in making such a through hole at the end of the hole jewel manufacturing process, more specifically in a machining step that consists in extending the height of a functional element formed in one face of the jewel so that it opens into another, opposite face. However, this solution is difficult to implement since it systematically requires performing complex, delicate and expensive operations intended to avoid any damage to the jewel during this machining step.

SUMMARY OF THE INVENTION

It is an object of the present invention to overcome all or part of the aforementioned drawbacks by proposing a method for manufacturing a hole jewel allowing a hole to be made through the body of the jewel preferably having a small diameter, for example, less than 100 μm. In this context, this manufacturing method is repeatable, but without causing any damage to the jewel or to the jewel manufacturing method.

To this end, the invention relates to a method for manufacturing a hole jewel, particularly forming a bearing, which includes the following steps:

forming a precursor from a mixture of at least one powder material with a binder;

pressing the precursor, by means of an upper die and a lower die provided with a punch, to form a green body of the future hole jewel including a blind cavity having a height comprised between a height of the green body and a height of the future hole jewel, the cavity being provided with upper and lower portions respectively including blanks of a through hole and of a functional element of the future hole jewel;

sintering said green body to form a body of the future hole jewel from said material;

machining the body of the future hole jewel, including a first sub-step of shaping a top of said body intended to form an upper surface of said hole jewel in readiness for an opening to be made in the blank of the through hole to allow the functional element to be connected to said upper surface, and a second sub-step of shaping a base of the body, during which the height of the lower portion that includes the blank of the functional element is configured.

Thus, as a result of these features, it is possible to make a through hole of any diameter (especially with a small diameter, for example, less than 100 μm) and a functional element, without using perforating tools such as a press tool wire or a laser, owing in particular to application of the punch, situated on the lower die, in the precursor of a green body of the hole jewel which defines the blanks of said through hole and functional element in the green body, and to the simplified machining step for configuring the height of the functional element and making an opening for the through hole in the upper surface of the hole jewel.

In other embodiments:

the upper and lower portions have different shapes;

the upper portion of the cavity has an essentially cylindrical shape and the lower portion a conical shape;

the blind cavity has an opening which is located in a lower face of said green body;

the second, shaping sub-step includes a phase of calibrating a through hole diameter;

the powder material is ceramic-based and contains at least a metallic oxide, a metallic nitride or a metallic carbide;

the ceramic-based powder material contains aluminium oxide;

the ceramic-based powder also contains chromium oxide;

the pressing step is carried out by bringing the upper and lower dies together inside a housing;

the sintering step includes pyrolysis;

the method includes a final step of finishing the hole jewel;

the final finishing step includes lapping and/or brushing and/or polishing.

The invention also relates to a system for manufacturing a hole jewel, particularly forming a bearing, which implements this method and includes:

a device for forming a precursor from a mixture of at least one powder material with a binder;

a device for pressing the precursor material including upper and lower dies arranged to move inside a housing in order to form a green body of the future hole jewel;

a device for sintering said green body;

a device for machining a body of the future hole jewel.

Advantageously, the lower die includes a punch intended to form a blind cavity in said green body, said cavity including upper and lower portions respectively including blanks of a through hole and of a functional element of the future hole jewel.

Also, advantageously, said punch includes a main portion having a conical shape and a distal portion provided with an essentially cylindrical tip, said punch having a length which is comprised between a height of the green body and a height of the future hole jewel.

Further, the invention also relates to a hole jewel, particularly forming a bearing, obtained from this method, said jewel having a lower surface provided with a functional element and a through hole connecting said functional element to an upper surface of said hole jewel.

The invention also relates to a mainplate of a timepiece movement including such a hole jewel, particularly forming a bearing.

Further, the invention also relates to a bridge of a timepiece movement including such a hole jewel, particularly forming a bearing.

Finally, the invention also relates to a timepiece comprising such a timepiece movement mainplate and/or such a timepiece movement bridge.

BRIEF DESCRIPTION OF THE DRAWINGS

Other features and advantages will appear clearly from the following description, given by way of non-limiting illustration, with reference to the annexed drawings, in which:

FIG. 1 is a representation of the hole jewel forming a bearing according to an embodiment of the invention.

FIG. 2 is a larger scale view of one portion B of FIG. 1 according to the embodiment of the invention.

FIG. 3 is a schematic representation of a system for manufacturing a hole jewel according to the embodiment of the invention;

FIG. 4 is a schematic view of a pressing device of the system according to the embodiment of the invention;

DETAILED DESCRIPTION OF PREFERRED EMBODIMENTS

As explained above, the invention relates to a hole jewel 2 capable of forming a bearing for a timepiece 27 intended to come into contact with a pivot to make the latter movable in rotation with minimum friction. It is thus clear that the present invention makes it possible to make a hole jewel 2 that can form all or part of a bearing arrangement for a rotatably mounted element.

Figure 8:
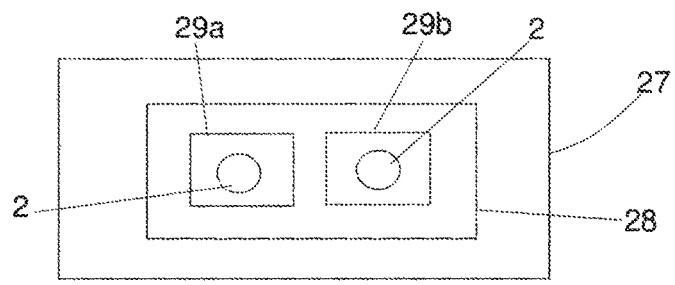
FIG. 8 is a schematic representation of a timepiece according to the embodiment of the invention.

According to the invention, such a bearing, including or formed by said hole jewel 2, is intended to be mounted in a mainplate 29a or a bridge 29b or to form all or part of a mainplate 29a or of a bridge 29b of a timepiece movement 28 of a timepiece 27 visible in FIG. 8. However, such a hole jewel 2 is not limited to the field of horology and can be applied to any element which is movably mounted relative to a bearing.

Advantageously according to the invention, hole jewel 2 includes a body with a through hole 20 intended to receive the pivot, also called a trunnion. Advantageously according to the invention, the body includes an upper surface 21a and a lower surface 21b, one of which includes a functional element 19 communicating with through hole 20.

FIGS. 1 and 2 show an example of a hole jewel 2 according to the invention. This hole jewel 2 has a generally annular body provided with a preferably centred through hole 20, which opens into upper surface 21a and into functional element 19 comprised in lower surface 21b of said hole jewel 2. In other words, hole 20 communicates with upper surface 21a and also with a substantially conical recess located in lower surface 21b and which thus includes this functional element 19. Functional element 19 thus forms a tapered engagement surface of hole jewel 2. It is also noted that an internal wall 24 of the jewel body located around hole 20 has a rounded area intended to minimise contact with the pivot but also to facilitate any lubrication. It will be noted that minimising contact with the pivot allows friction with the pivot to be reduced.

It will be noted that, in variants, this hole jewel 2 can include one functional element 19, also formed on upper surface 21a, or several identical or non-identical functional elements formed on the same surface 21a, 21b of hole jewel 2. Likewise, it will be noted that functional element 19 is in no way limited to a substantially conical recess but may have a different shape or form several combined shapes.

Referring to FIG. 3, the invention also relates to a system 1 for manufacturing hole jewel 2. This system 1 includes the following various devices:

- a device 3 for forming a precursor 10 from a mixture of at least one powder material with a binder;
- a device 4 for pressing precursor material 10 including upper and lower dies 7, 8 arranged to move inside a housing 9 in order to form a green body 11 of the future hole jewel 2;
- a device 5 for sintering said green body 11, and
- a device 6 for machining body 12 of the future hole jewel 2 obtained from sintering green body 11.

It will be noted that at least two of these devices 3 to 6 can together form a same entity of system 1.

In the press device 4 visible in FIG. 4, each die 7, 8 is fixed to a double-acting press. According to the invention, one (or both) of dies 7, 8 is brought closer to the other in directions A inside housing 9 of said press device 4 to form not only the upper and lower faces 22a, 22b of a green body 11 of future hole jewel 2, but also the external walls of said body 11. In this press device 4, dies 7, 8 are substantially planar and lower die 8 includes a punch 13 intended to form a blind cavity 14 inside green body 11. This punch 13 has a main portion 17a having a conical shape and an essentially cylindrical distal portion 17b which is provided with a tip 25. Main portion 17a and distal portion 17b are respectively intended to form lower portion 15b and upper portion 15a of blind cavity 14. Tip 25 of distal portion 17b is arranged to form the bottom of cavity 14. Punch 13 has a height L which is greater or substantially greater than a height H1 of future hole jewel 2. In other words, the height L of punch 13 is comprised between a height H3 of green body 11 and the height H1 of future hole jewel 2. This height L is strictly less than height H3 of green body 11. It will be noted that, in a variant, height L of punch 13 may be substantially equal or equal to height H1 of the hole jewel 2 seen in FIG. 1.

Figure 5:
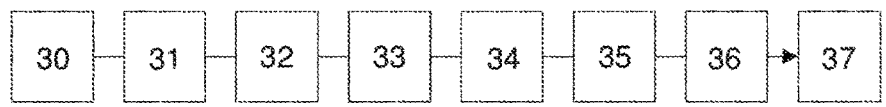
FIG. 5 is a logic diagram relating to a method for manufacturing a hole jewel according to the embodiment of the invention.

This system 1 is capable of implementing a method for manufacturing hole jewel 2 represented in FIG. 5. This method includes a step 30 of forming a precursor 10 from a mixture of at least one powder material with a binder. This material may, in a non-limiting and non-exhaustive manner, be ceramic material. Step 30 is intended to form a ceramic precursor 10 from a ceramic based powder in a binder.

In this context, the ceramic based powder may contain at least one metallic oxide, one metallic nitride or one metallic carbide. By way of example, the ceramic based powder may include aluminium oxide to form synthetic sapphire or a mixture of aluminium oxide and chromium oxide to form synthetic ruby. Further, the binder may be of various types, such as, for example, polymer or organic types.

Figure 6:
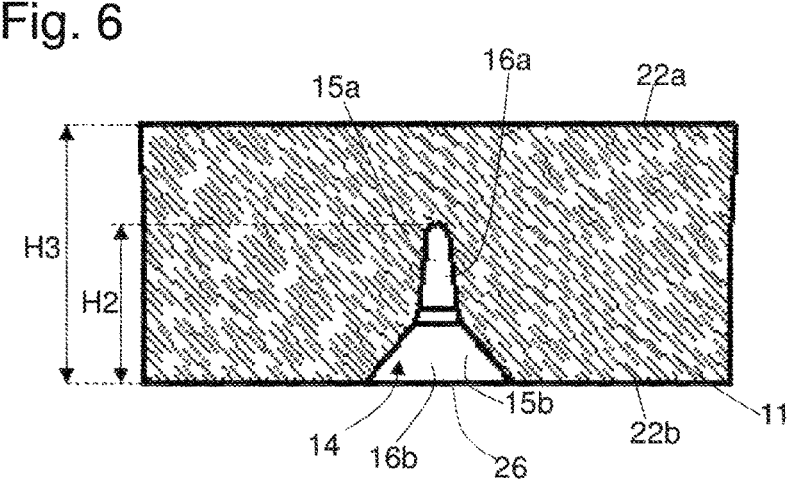
FIG. 6 is a schematic representation of a green body of the future hole jewel according to the embodiment of the invention.

The method includes a step 31 of pressing precursor 10 using upper die 7 and lower die 8 of press device 4 to form green body 11 of the future hole jewel 2 visible in FIG. 6. This green body 11 includes blind cavity 14 provided with upper and lower portions 15a, 15b, which are of different shapes. Indeed, lower portion 15b, which forms the functional element blank 16b, has a conical shape and upper portion 15a, which includes the through hole blank 16, has a cylindrical shape. Hole blank 16a includes a bottom of cavity 14. Cavity 14 also includes an opening 26 formed in green body 11 and opening into lower face 22b of green body 11. It will be noted that this functional element blank 16b makes it possible to form the tapered engagement surface of hole jewel 2 for easier assembly of the pivot, especially when the pivot is to be mounted blind in hole jewel 2 which, in this example forms a bearing. It is thus clear that the shape of functional element 19 on lower surface 21b of hole jewel 2 is directly provided by the shape of punch 13 of lower die 8, especially by its main portion 17a, without thereby weakening the future hole jewel 2. In other words, this pressing step 31 is intended to compress precursor 10, by means of upper die 8 and lower die 7, to form said green body 11 of future hole jewel 2 with upper face 22b of said body 11, which includes functional element blank 16b.

In this configuration, cavity 14 has a height H2 which is equal or substantially equal to that of punch 13, since they have complementary shapes. In these conditions, height H2 of cavity 14 is greater or substantially greater than height H1 of future hole jewel 2. In other words, the height H2 of cavity 14 is comprised between a height H3 of green body 11 and the height H1 of future hole jewel 2. This height H2 is strictly less than height H3 of green body 11. It will be noted that, in a variant, height H2 of cavity 14 may be substantially equal or equal to height H1 of hole jewel 2.

Figure 7:
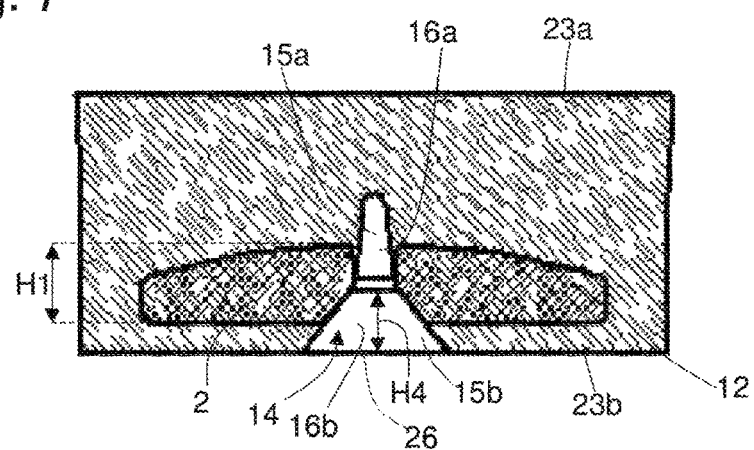
FIG. 7 is a schematic representation of the final sintered hole jewel volume within the green body volume according to the embodiment of the invention.

The method includes a step 32 of sintering green body 11 to form a body 12 of the future hole jewel 2 from the material which, as mentioned above, can therefore be ceramic material (seen in FIG. 7). In other words, step 32 is intended to sinter green body 11 to form a ceramic body 12 of future hole jewel 2. Preferably, according to the invention, sintering step 32 can include pyrolysis.

Finally, the method includes a step 33 of machining body 12 of future hole jewel 2. This step 33 includes a first sub-step 34 of shaping a top 23a of said body 12 intended to form upper surface 21a of said hole jewel 2. During the course of this sub-step 34, an opening is made in through hole blank 16a to connect functional element 16b to upper surface 21a. This step 33 also includes a second sub-step 35 of shaping a base 23b of body 12 during which a height H4 of lower portion 15a including functional element blank 16b is configured. This height H4 is configured according to the desired height that is to be given to the tapered engagement surface of hole jewel 2 and which can be determined in accordance with the features of the pivot that is arranged to cooperate with functional element 19 of jewel 2. This second shaping sub-step 35 can include a phase 36 of calibrating the diameter of through hole 20 thus allowing the diameter of hole 20 to be configured.

Machining step 33 is preferably carried out using destructive laser radiation to obtain a very precise etch. However, step 33 may be obtained using other types of processes, for example, mechanical shrinkage, such as mechanical perforation or high-pressure water cutting.

The method may also include a step 37 of finishing the hole jewel 2. This finishing step 37 may thus include lapping and/or brushing and/or polishing for adjustment of the final dimensions and/or the shrinkage of edges and/or the local modification of roughness.

It will be noted that such a method does not necessarily require any olive-cutting or chamfering of hole jewel 2, owing in particular to the specific shape of punch 13 which allows both functional element 19 and through hole 20 to be formed in the jewel.

Of course, the present invention is not limited to the illustrated example, but is capable of various variants and modifications that will appear to those skilled in the art. In particular, other types of functional elements formed by other punch geometries and/or geometries of dies 7, 8 can advantageously be envisaged according to the invention.

The invention claimed is:

1. A Method for manufacturing a hole jewel, comprising the following steps:
   forming a precursor from a mixture of at least one powder material with a binder;
   pressing the precursor, with an upper die and a lower die provided with a single punch, to form a green body of the future hole jewel having a single blind cavity with a height comprised between a height of the green body and a height of the future hole jewel, the cavity being provided with upper and lower portions respectively including blanks of a through hole and of a functional element of the future hole jewel;
   sintering said green body to form a body of the future hole jewel from said at least one material, and
   machining the body of the future hole jewel including a first sub-step of shaping a top of said body configured to form an upper surface of said hole jewel in readiness for an opening to be made in the through hole blank to allow the functional element to be connected to said upper surface, and a second sub-step of shaping a base of the body during which a height of the lower portion that includes the functional element blank is configured.

2. The method according to claim 1, wherein the upper and lower portions are of different shapes.

3. The method according to claim 1, wherein the upper portion of the cavity has an essentially cylindrical shape and the lower portion a conical shape.

4. The method according to claim 1, wherein the blind cavity comprises an opening which is formed in a lower face of said green body.

5. The method according to claim 1, wherein the second shaping sub-step comprises a phase of calibrating a diameter of the through hole.

6. The method according to claim 1, wherein the powder material is a ceramic based material and comprises at least one metallic oxide, one metallic nitride or one metallic carbide.

7. The method according to claim 6, wherein the ceramic based powder material comprises aluminium oxide.

8. The method according to claim 6, wherein the ceramic based powder material further comprises chromium oxide.

9. The method according to claim 1, wherein the pressing step is carried out by bringing the upper and lower dies together inside a housing.

10. The method according to claim 1, wherein the sintering step comprises pyrolysis.

11. The method according to claim 1, wherein the method comprises a step of finishing the hole jewel.

12. The method according to claim 11, wherein the finishing step comprises lapping and/or brushing and/or polishing.

* * * * *